(12) United States Patent
Holtzman

(10) Patent No.: US 8,806,943 B2
(45) Date of Patent: Aug. 19, 2014

(54) GOLF SHAFT ASSEMBLY OSCILLATION ANALYZER

(76) Inventor: Barry Lyn Holtzman, Eagle River, WI (US)

( * ) Notice: Subject to any disclaimer, the term of this patent is extended or adjusted under 35 U.S.C. 154(b) by 266 days.

(21) Appl. No.: 13/506,062

(22) Filed: Mar. 22, 2012

(65) Prior Publication Data

US 2013/0247670 A1    Sep. 26, 2013

(51) Int. Cl.
*G01M 13/00* (2006.01)
*G01M 7/02* (2006.01)

(52) U.S. Cl.
USPC ........................................................ 73/579

(58) Field of Classification Search
USPC ......... 73/579–583, 649–668, 862.59, 862.61, 73/862.621, 514.36–514.37; 473/131–409
See application file for complete search history.

(56) References Cited

U.S. PATENT DOCUMENTS

| 3,395,571 A | 8/1968 | Murdock |
| 4,122,593 A | 10/1978 | Braly |
| 5,040,279 A | 8/1991 | Braly |
| 5,351,951 A | 10/1994 | Hodgetts |
| 6,546,802 B2 * | 4/2003 | Shiraishi et al. ................ 73/579 |
| 6,607,450 B1 | 8/2003 | Hackman |

* cited by examiner

*Primary Examiner* — Peter Macchiarolo
*Assistant Examiner* — Anthony W Megna Fuentes

(57) ABSTRACT

An analyzer that can provide information concerning a golf shaft assembly's oscillation properties, its natural frequency and its flat line oscillation planes. In the embodiments presented, a clamping assembly holds both the golf shaft assembly and an oscillator. Oscillation of the golf shaft assembly and that of the oscillator with known oscillation properties provides information about the golf shaft assembly's oscillation properties. Some of the test procedures presented are made possible by oscillation coupling between the golf shaft assembly and the oscillator. Oscillator assemblies are presented which have adjustable natural frequencies and one has a preferred oscillation deflection plane.

20 Claims, 3 Drawing Sheets

GOLF SHAFT ASSEMBLY OSCILLATION ANALYZER

CROSS REFERENCE TO RELATED APPLICATIONS

Not Applicable

FEDERALLY SPONSORED RESEARCH OR DEVELOPMENT

Not Applicable

SEQUENCE LISTING, TABLE, OR PROGRAM

Not Applicable

BACKGROUND

1. Field

This application relates to an analyzer used to determine oscillation properties of a golf shaft assembly.

2. Prior Art

Golf clubs have three main components; a shaft, a club head attached to the shaft's tip end, and a grip on the shaft's butt end. The masses of these three components and how they lie along the length of the club determine the club's mass distribution. Since the club head is relatively inflexible and the grip relatively flexible compared to the shaft, the shaft is primarily responsible for the flexibility of the golf club. Shafts are normally tapered, round, hollow, and may have a wall thickness that varies along their axes, and these properties, along with the material used in the shaft and its overall length, determine the shaft's flexibility profile. The club's mass distribution and flexibility profile determine the club's oscillation properties. Two of these oscillation properties which are important to club fitters are the oscillation's fundamental natural frequency and a preferred rotational orientation of the oscillation around the shaft's axis which minimizes wobbling during a golf swing.

The oscillation's natural frequency will be discussed first. Shaft manufacturers use a shaft flexibility rating in an attempt to predict a frequency of a finished club. A standard flex rating system uses LL, or 2.0, for ladies light, L, or 3.0, for ladies, A, or 3.0, for amateur or senior, R, or 4.0, for regular, S, or 5.0, for stiff, X, or 6.0, for extra stiff, and XX, or 8.0, for extra-extra stiff. There are problems with this rating system, one being that there is no industry standard for shaft stiffness. Another problem is that heads have different masses; a driver head is lighter than say a 3 wood head, but the same shaft may be installed in both. Mass affects frequency, so just knowing a shaft flex rating does not allow knowing the frequency of a finished golf club with a particular head. Another problem is that shafts come from the manufacturer with a length longer than normally needed and the shaft is shortened to meet the requirements of the intended golfer. Shaft length affects frequency, so knowing a flex rating for a shaft having an "as manufactured" length does not allow knowing the frequency of a finished club with a shortened shaft.

Golf shaft assembly frequency analyzers are available which use an electronic counting mechanism to determine oscillation frequency. These analyzers use a clamp to hold the upper 12.7 cm (5 inches) of the shaft's butt end, an industry standard. The shaft assembly to be tested can be a finished club, or if the shaft does not have a head installed, an industry standard is to create a shaft assembly by temporarily installing a 205 gram weight on the tip end of the shaft to simulate the weight of a head. Testing can be done with or without a grip installed. With the shaft assembly held in the clamp, the tip end of the assembly is twanged; it is deflected and released. The shaft assembly oscillates, and usually using some form of light sensor or pressure transducer, an electronic counter measures the natural frequency of oscillation, usually expressed in units of cycles per minute (CPM).

The second important property of a golf shaft assembly's oscillation is a preferred rotational orientation of the oscillation around the shaft's axis. Most shafts have a "spine" which lies along the edge of the shaft where the material used to make the shaft is joined. This spine and other manufacturing irregularities can result in a flexibility profile of the shaft which is not constant with rotation around the shaft's axis, and these irregularities can cause wobbling for many rotational orientations of the oscillation around the shaft's axis.

A shaft which is not flexed has an axis which is essentially a straight line. When a shaft is bent, its axis becomes an arc, and a term "deflection plane" can be used to define a plane which "on average" contains this arc. The term "on average" must be used because if a shaft has a flexibility profile not constant with axial rotation, the arc may be "splayed" out to one side; the axis is not contained in the deflection plane but bulges slightly to one side or the other. Most shafts normally, however, have two essentially orthogonal deflection planes in which its axis does essentially lie in a plane. Once started oscillating in one of these planes, it will oscillate with its axis essentially always in that plane, and such as plane is called a "flat line oscillation" plane, or FLO plane. Oscillation in which the shaft's axis always essentially lies in a FLO plane can be called "planar oscillation", "pure oscillation", or FLO.

FLO testing normally involves twanging the tip end of a shaft assembly and observing its subsequent oscillation. The deflection is done with several deflection planes located rotationally around the shaft's axis, and almost all these deflection planes will result in shaft oscillations which wobble. As discussed above, there are normally two deflection planes which will result in FLO; the shaft is observed to be in essentially pure oscillation without wobble. The tip end follows a straight line, or "flat line", rather than somewhat of an oval shape, hence the term flat line oscillation. Once these FLO planes are found, the club head is normally installed on the shaft so that one of them is perpendicular to the face of the head. This will cause most of the shaft's flexing during the swing to be planar, minimizing undesirable wobbling during the swing.

There are some difficulties in the FLO testing described above. One problem is knowing exactly the deflection plane associated with the twanging. An operator may think his deflection plane is vertical for instance, where in reality it may be several degrees off. Also, determining whether the shaft assembly is in FLO or wobbling can be difficult because of the relatively rapid rate at which the oscillation occurs. Sometimes means are employed to more easily see wobbling such as attaching a laser light to the oscillating shaft assembly and shining this light on a distant surface. These processes can be time consuming, require a relatively high degree of judgment by the operator, and have limited accuracy.

Desirable features of a golf shaft oscillation analyzer are an ability to determine the fundamental natural frequency and flat line oscillation planes of a golf shaft assembly.

SUMMARY

In accordance with one embodiment, a golf shaft oscillation analyzer includes a calibrated adjustable frequency oscillator and a clamping assembly. The clamping assembly holds both a test golf shaft assembly and the oscillator such that their oscillations are coupled. Several frequency and flat line oscillation testing procedures are available which provide information about the shaft assembly's natural frequency and flat line oscillation planes.

DRAWINGS

Brief Description

Figure 1:
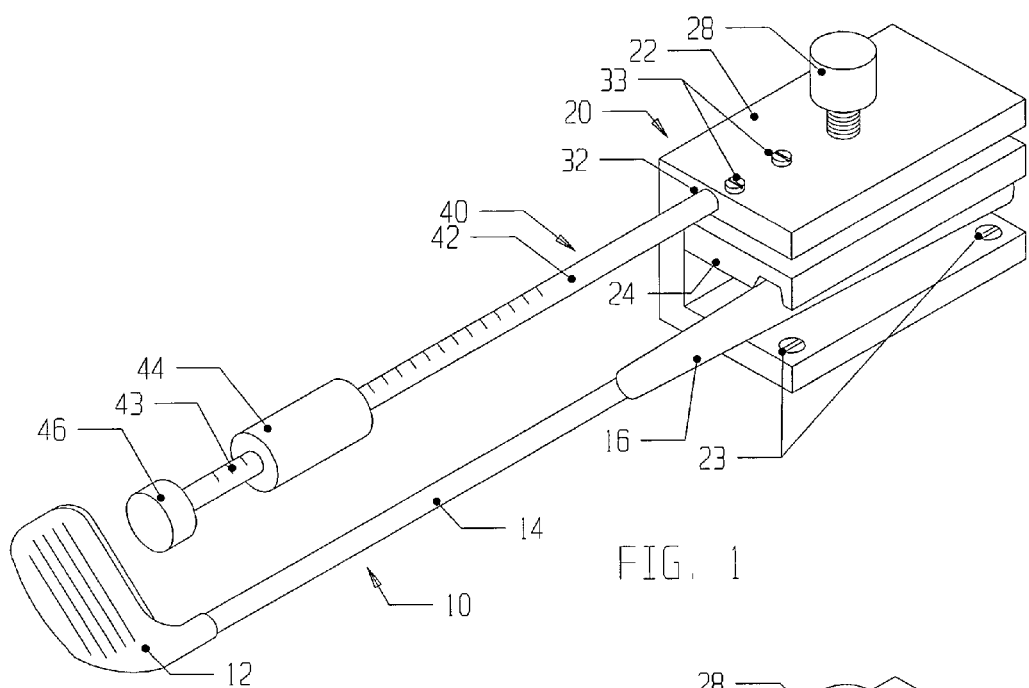
FIGS. 1 and 2 show a test golf club clamped in a first embodiment of a golf shaft assembly oscillation analyzer, the analyzer comprising a clamping assembly and an adjustable frequency oscillator. The oscillator uses a fixed round rod and a weight moveable on the rod to change its natural frequency.

REFERENCE NUMERALS 10 golf club
11 standardized shaft assembly
12 golf club head
13 standard head substitution weight
14 golf club shaft
16 golf club grip
20 clamping assembly
22 clamping assembly body
23 body mounting screws
24 clamping block
28 clamping bolt
32 hole in body
33 flexible member locking screws
40 adjustable frequency oscillator assembly, first embodiment
42 flexible member, fixed round rod
43 frequency calibration marks
44 moveable weight
46 fixed weight
50 adjustable frequency oscillator assembly, second embodiment
52 flexible member, moveable round rod
53 frequency calibration marks
56 fixed weight
60 adjustable frequency oscillator assembly, third embodiment
62 flexible member, fixed rectangular bar
63 frequency calibration marks
64 moveable weight

DETAILED DESCRIPTION

Figure 2:
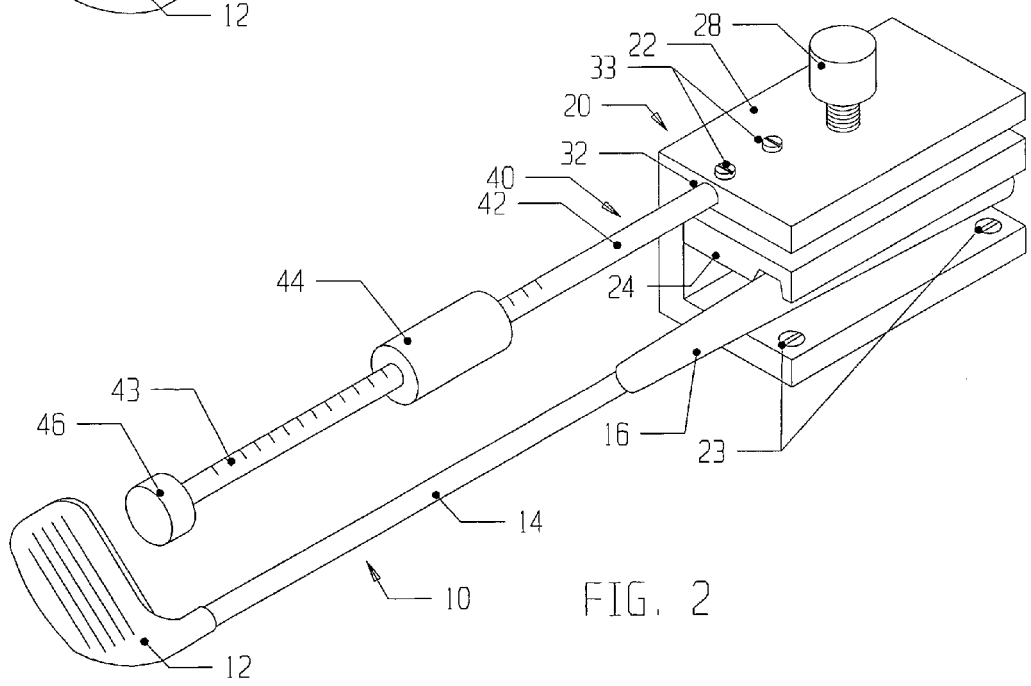

FIGS. 1 and 2

First Embodiment

FIGS. 1 and 2 show a first embodiment of a golf shaft oscillation analyzer of this invention holding a golf club 10. Club 10 has a head 12 attached to the tip end of a shaft 14 and a grip 16 applied to its butt end. The analyzer has a clamping assembly 20 comprising a body 22, a clamping block 24, and a clamping bolt 28. Screws 23 can be used to mount body 22 to a work bench (not shown), or the bottom leg of body 22 can be secured in a vice (not shown). Body 22 has a hole 32 and locking screws 33 used to hold a flexible round rod 42, part of an adjustable frequency oscillator assembly 40. Round rod 42 has frequency calibration marks 43 along its length and a fixed weight 46 positioned at its end. A moveable weight 44 is shown positioned relatively close to the free end of rod 42 in FIG. 1 and relatively farther in FIG. 2.

Operation—FIGS. 1 and 2

In this first analyzer embodiment, the test piece is golf club 10. The grip 16 end of club 10 is placed in clamping assembly 20 and bolt 28 is turned to apply sufficient force to clamping block 24 to securely hold club 10 against the lower leg of body 22. Adjustable frequency oscillator assembly 40 has as its flexible member round rod 42, and since round rod 42 is fixed to body 22 in hole 32 by screws 33, rod 42 has a fixed flexibility profile. The mass distribution of oscillator assembly 40 is determined by the masses of rod 42 and weights 44 and 46 and how these masses lie along the length of rod 42. In this embodiment, moveable weight 44 can slide along rod 42 and thus adjust the overall mass distribution and fundamental natural frequency of oscillator assembly 40. The natural frequency of oscillator assembly 40 is reduced as weight 44 is moved toward the free end of rod 42. Attaching fixed weight 46 to the end of rod 42 allows moveable weight 44 to have a lower mass, thus improving the resolution of assembly 40 since weight 44 must be moved a greater distance for any given frequency change. A suitable oscillator assembly 40 was made having rod 42 made from aluminum tubing with an outside diameter of 9.5 mm (0.375 inches), a wall thickness of 1.47 mm (0.058 inches), and a suspended length of 83.8 cm (33 inches). Fixed weight 46 had a mass of 53 grams and moveable weight 44 was 295 grams. This allowed the natural frequency of oscillator assembly 40 to be adjusted from less than 200 CPM to over 350 CPM which covers the frequency range normally encountered in golf shaft assemblies.

The frequency and flat line oscillation testing procedures used in the embodiments presented here involve a comparison between two oscillating members, the test shaft assembly and an oscillator. In the case of this first embodiment, these oscillating members are golf club 10 and oscillator assembly 40. These testing procedures are affected by whether oscillations in the two members are "coupled", meaning oscillation in one member can affect oscillation in the other.

Clamping assembly 20 will not provide this oscillation coupling if it has no operationally significant flexibility, for instance if body 22 has thick steel legs. If body 22 is sufficiently stiff, the two oscillating members, club 10 and oscillator assembly 40, oscillate essentially independently with their own natural frequency; neither member knows what the other is doing. Of course, another way of achieving this isolation is to hold the two oscillating members in two completely separate and isolated clamping devices.

If, however, clamping assembly 20 has sufficient flexibility, it will effectively couple the oscillations of the two members, in this case club 10 and oscillator assembly 40. Under certain conditions, coupling allows energy to be transferred from one oscillating member to the other and back again. The oscillation of each member oppositely and periodically goes through maximum and minimum amplitudes, and the oscillations can be said to be "beating". It has been found that body 22 has sufficient flexibility to provide operationally significant coupling if manufactured from aluminum U-channel having a base width of 7.6 cm (3 inches) and thickness of 4.3 mm (0.17 inches), legs having a length of 4.4 cm (1.75 inches) with a thickness of 6.6 mm (0.26 inches), and a length of 12.7 cm (5 inches), the industry standard clamping length.

A first frequency testing procedure used with this first embodiment to obtain information about the fundamental natural frequency of club 10 is to simultaneously twang club 10 and oscillator assembly 40 with the same deflection plane and in the same or opposite directions. Since both oscillating members are deflected, this procedure works whether or not oscillation coupling exists. For instance, club 10 and oscillator assembly 40 are both pushed downward and released at the same time. This starts them oscillating essentially in phase and with essentially the same deflection plane. If there is a relatively large difference in the natural frequencies of club 10 and assembly 40, they will immediately start oscillating out of phase. The frequency of oscillator assembly 40 is then adjusted by sliding moveable weight 44 along rod 42 and the twanging is repeated. When weight 44 is positioned so the natural frequencies of the two members are close, without operationally effective coupling an operator will see the two members oscillate in phase for a considerable time. With coupling, he will also normally see a relatively slow beating of the two members because even though the two members have nearly the same natural frequency, they rarely have exactly the same mass distribution and flexibility profile. When an operator sees extended in-phase oscillation, he knows that the two member are near resonance and the frequency of club 10 is read using the position of moveable weight 44 in relation to calibration marks 43.

If oscillation coupling is provided by clamping assembly 20, a second frequency testing procedure is possible in which only one member is twanged while the other is at rest. For instance, the oscillator, assembly 40, is twanged while the test shaft assembly, club 10, is at rest. If weight 44 is positioned such that the natural frequency of assembly 40 is substantially different from that of club 10, club 10 has essentially no movement because the oscillation coupling delivers forces to club 10 which are not timed properly due to the large frequency difference. If assembly 40 is twanged but with weight 44 positioned so the frequency of oscillator assembly 40 more closely matches that of club 10, some of the energy that is in the oscillation of assembly 40 "migrates" over to club 10 and its oscillation increases while assembly 40 oscillation decreases. This migration of oscillation energy continues back and forth, with the oscillations in club 10 and assembly 40 beating, alternately reaching maximum and minimum amplitudes. When the natural frequencies of club 10 and assembly 40 are equal, this energy migration reaches a peak, the oscillation in club 10 attains its greatest amplitude, and the beat frequency reaches a minimum, meaning the migration occurs at it slowest rate. With the coupling provided by the construction indicated above for body 22, the beat frequency at resonance, is relatively low and club 10 appears to oscillate with assembly 40 for a relatively long time. When this is seen, the shaft assembly, club 10, is near resonance with the oscillator, assembly 40, and the natural frequency of club 10 is indicated by the position of weight 44 relative to calibration marks 43.

Other frequency testing procedures can be used. In the first procedure, twanging in opposite directions also works. In the second procedure, the test shaft assembly can be twanged with the oscillator resting. Also, since the first frequency testing procedure is generally faster to perform than the second, a combination of the two has been found to work well where an operator uses the first procedure to get an approximation to resonance and then completes the testing with the second procedure. The operator with a little practice, using either the first or second procedure or a combination of both, can become proficient in observing where the oscillator and the shaft assembly are near resonance, thereby providing information about the natural frequency of the test shaft assembly.

Flat line oscillation testing on a shaft assembly can also be performed by this first analyzer embodiment. A first FLO testing procedure is similar to the first frequency testing procedure and it also can be performed on coupled or uncoupled systems. With the natural frequency of the oscillator, oscillator assembly 40, essentially matched to the natural frequency of the test shaft assembly, club 10, both are twanged downwardly with a vertical deflection plane. Assuming oscillator assembly 40 by its construction and rotational placement of rod 42 in body 22 has a vertical FLO plane, assembly 40 will start in vertical FLO. FLO of club 10 can be checked by, for instance, looking down vertically at shaft 14 and seeing if it has any horizontal movement relative to rod 42. This observation is aided by the fact that club 10 and assembly 40 are oscillating together and shaft 14 and rod 42 remain relatively close. This test procedure is repeated with different rotational orientations of club 10 in clamping assembly 20 until little horizontal movement is observed in shaft 14, indicating club 10 is in FLO and the present vertical plane through the axis of shaft 14 is a FLO plane.

A second FLO testing procedure is similar to the second frequency testing procedure, and this procedure, like the second frequency testing procedure, only works if coupling is present. Only one member, oscillator assembly 40 for instance, is twanged while the other member, club 10, is at rest. This is done with the natural frequency of oscillator assembly 40 set to approximately the natural frequency of club 10. Again assuming oscillator assembly 40 is in vertical FLO, it urges club 10 to oscillate in vertical FLO. Since club 10 started at rest and the motion is periodic, it will continue to have periods when it tries to return to its initial resting condition. Observation of club 10 oscillation is facilitated by placing a dot on the bottom of head 12 approximately in line with the axis of shaft 14 and watching the dot's movement, especially when the oscillation in club 10 is at a minimum and the dot has little movement. When club 10 is rotationally located in clamping assembly 20 so the dot has minimal horizontal movement, especially watching when the dot tries to come to rest, this indicates the present vertical plane through the axis of shaft 14 is a FLO plane. This test has good accuracy because of the periodic relatively small movement of the dot.

A third FLO testing procedure is similar to the second but in this case the frequency of oscillator assembly 40 is set slightly away from the natural frequency of club 10, for instance 5 to 10 CPM above or below. As indicated above, if the natural frequency of assembly 40 is away from that of club 10, the beat frequency is higher than if they are essentially matched, and this higher beat frequency reduces test time. In other respects, this third FLO test procedure is performed the same as the second.

Figure 3:
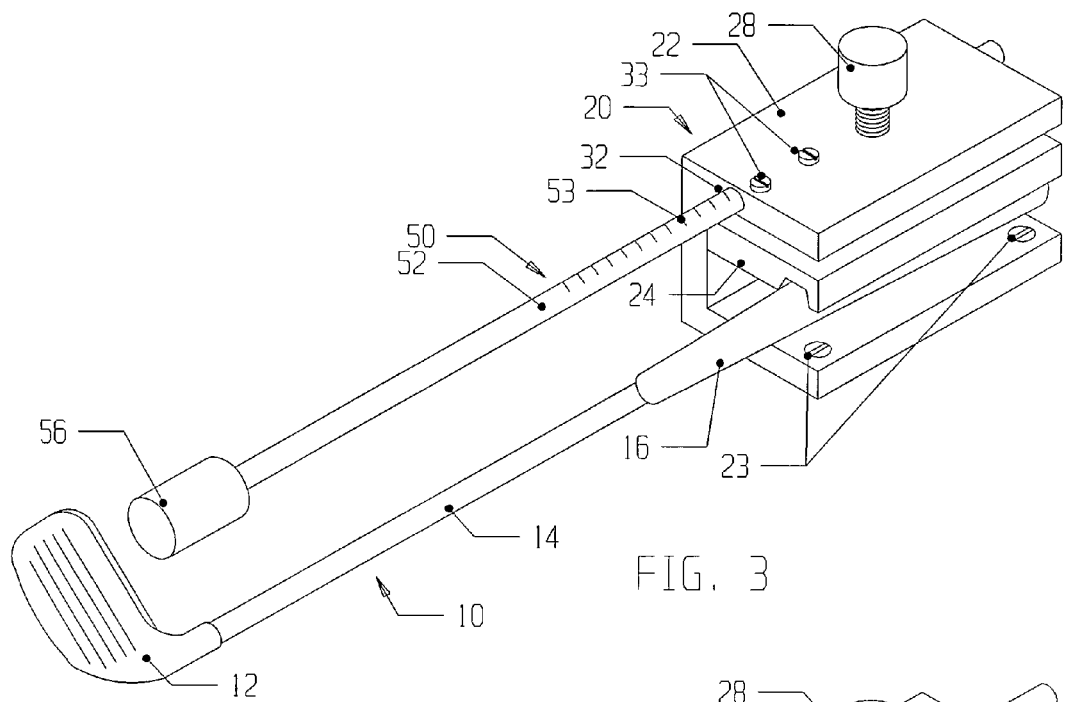
FIGS. 3 and 4 show a second similar embodiment but its oscillator uses a moveable flexible member to change its natural frequency.
Figure 4:
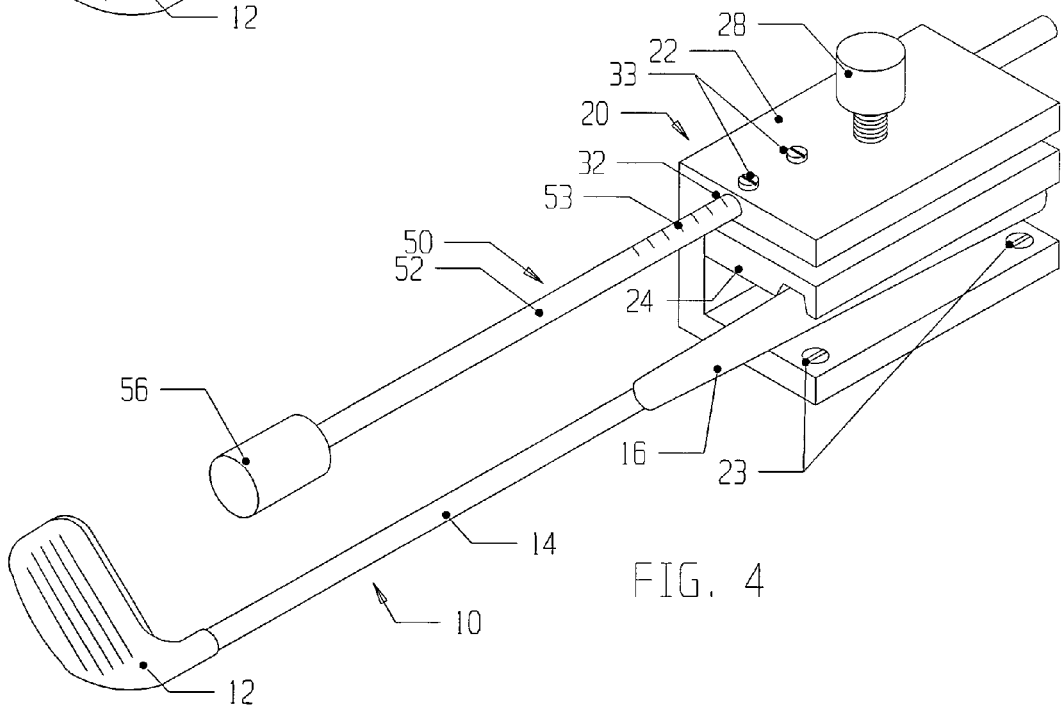

FIGS. 3 and 4

Second Embodiment

FIGS. 3 and 4 show a second embodiment of an oscillation analyzer of this invention and again the test piece is golf club 10. This second embodiment is similar in construction and operation to the first but in this case its oscillator, adjustable frequency oscillator assembly 50, has a flexible member, round rod 52, which can slide in hole 32 and is temporarily locked by screws 33. A fixed weight 56 is shown attached to the free end of rod 52, and rod 52 has frequency calibration marks 53. FIG. 3 shows rod 52 with a relatively long suspended length and FIG. 4 shows a relatively short suspended length.

Operation—FIGS. 3 and 4

Operation of this second analyzer embodiment is similar to the first except the suspended length of rod 52 is changed in order to change its flexibility profile and therefore the natural frequency of oscillator assembly 50. As the suspended length of rod 52 is increased, the frequency of oscillator assembly 50 decreases. Oscillation testing is performed as described for the first embodiment, both frequency and FLO testing, except for the manner in which the frequency of oscillator assembly 50 is adjusted. The frequency of assembly 50 is read using frequency calibration marks 53, for instance where calibration marks 53 intersect body 22.

FIG. 5

Third Embodiment

Figure 5:
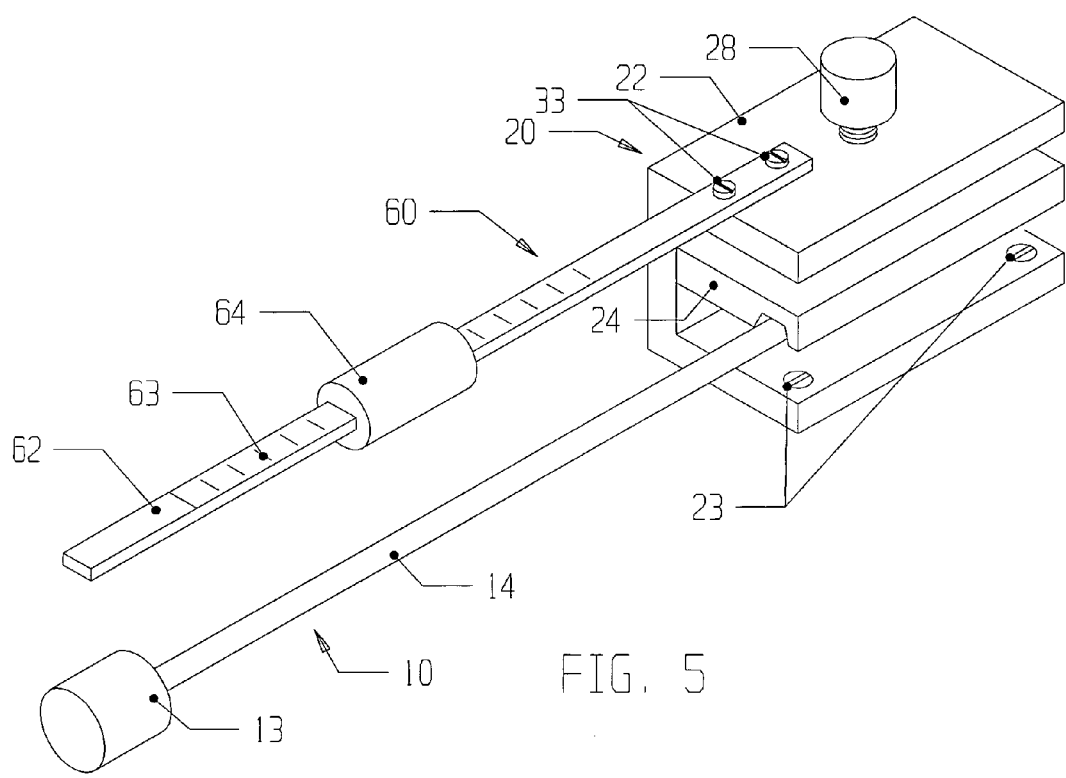
FIG. 5 shows a third embodiment but an un-gripped golf shaft assembly is the test piece and its oscillator has a fixed rectangular bar for its flexible member and a moveable weight to change its frequency.

FIG. 5 shows a third embodiment of a golf shaft oscillation analyzer of this invention. In this case, testing is being performed on a un-gripped standardized shaft assembly 11 made by temporarily attaching a weight 13 with an industry standard mass of 205 grams to the tip end of shaft 14. This third embodiment is similar to the first embodiment shown in FIGS. 1 and 2 except principally that its oscillator, an adjustable frequency oscillator assembly 60, uses a rectangular bar 62 as its flexible member and bar 62 is fixed to an edge of body 22 using clamping screws 33. A moveable weight 64 is used to change the mass distribution and frequency of oscillator assembly 60. Bar 62 has frequency calibration marks 63 so the position of weight 64 can easily be read as frequency of oscillator assembly 60. Also, because of the relative weakness of bar 62 to vertical deflection, it has been found that in many cases an end weight such as fixed weight 46 in FIGS. 1 and 2 is not necessary.

Operation—FIG. 5

Operation of this third embodiment is similar to that of the first two embodiments, both in frequency and FLO testing, but the rectangular shape of flexible member 62 is of benefit. For instance, bar 62 was made from aluminum having a suspended length of 76 cm (30 inches), a width of 19 mm (¾ inches), and a height of 4.8 mm (3/16 inches), and moveable weight 64 had a mass of 115 grams. This combination allowed the natural frequency of oscillator assembly 60 to be adjusted from less than 200 CPM to greater than 350 CPM when oscillating vertically. This construction of bar 62 has a horizontal deflection spring rate which is about sixteen times its vertical rate. This higher spring rate is due to the fact that the moment of inertia of the rectangular cross-section of bar 62 around a vertical axis through its centroid is greater than it is around a horizontal axis. With weight 64 placed at any position along bar 62, oscillator assembly 60 has a horizontal oscillation natural frequency about four times its vertical frequency.

The difference in horizontal and vertical stiffness and frequency of oscillator assembly 60 due to the rectangular shape of bar 62 has benefits assuming the test deflection plane is vertical. First, assuming an operator is attempting a vertical deflection plane for oscillator assembly 60, the deflection plane is going to be essentially vertical since the horizontal spring rate of bar 62 is significantly higher than its vertical spring rate. A second benefit is that assembly 60 is going to have a well-defined vertical FLO plane; it is not necessary to worry about manufacturing irregularities or rotational orientation on body 22 of bar 62. A third benefit that ensues when coupling is present is that, assuming the vertical oscillation frequency of assembly 60 is relatively close to the natural frequency of shaft assembly 11, then the horizontal natural frequency of oscillator assembly 60 is going to be considerably higher than that of shaft assembly 11. This basically renders oscillation coupling ineffective for horizontal oscillation because of the large difference in the horizontal frequencies; any horizontal oscillation in either member can have little effect on the other member. The result is that oscillator assembly 60 will always be in essentially vertical FLO even if shaft assembly 11 is not. This horizontal "stability" of bar 62 makes this third embodiment work well for all frequency and FLO testing procedures.

This third embodiment works especially well when determining a FLO plane of shaft 14. In the first procedure where both members, in this case assemblies 11 and 60, are twanged, the operator knows oscillator assembly 60 is in vertical FLO even if coupling exists, allowing a more accurate comparison of shaft assembly 11 to assembly 60. In the second and third FLO test procedures where only one member, oscillator assembly 60 for instance, is twanged while the other member, shaft assembly 11, is at rest, the fact that assembly 60 is in vertical FLO and always will be in vertical FLO means shaft assembly 11 receives essentially purely vertical "urgings". In other words, without the operator even touching shaft assembly 11, it is "urged" to a purely vertical oscillation and is never given anything but vertical "urges"; if it wobbles, it is doing it on its own. A dot placed axially on standard weight 13 is again a benefit for FLO observation. Because the operator knows that shaft assembly 11 is urged to pure vertical oscillation, when he sees relatively pure vertical movement of the dot and periodically its approaching rest with little horizontal movement, he knows that the present vertical plane through the axis of shaft 14 is a FLO plane.

CONCLUSION, RAMIFICATIONS, AND SCOPE

Accordingly, the reader will see that these analyzer embodiments can provide information about the oscillation properties of a golf shaft assembly, both the oscillation's natural frequency and its flat line oscillation planes. These embodiments use an oscillator with known oscillation properties in several testing procedures to obtain this information. Oscillators are shown which have adjustable natural frequencies, and one is shown with a preferred deflection plane. Oscillation coupling between the oscillator and the shaft assembly make some of these testing procedures possible.

Although the description above contains many specificities, these should not be construed as limiting the scope of the invention but as merely providing illustrations of some embodiments of the invention. For instance, adjustable frequency oscillator assemblies are discussed which use a moveable flexible member or moveable weight to adjust their natural frequency, but other methods can be used such as adding or subtracting weight. Also, the use of an adjustable oscillator is discussed, but interchanging a number of fixed oscillators with fixed frequencies would also work. Also discussed is providing flexibility in the body of the clamping assembly to provide oscillation coupling, but other methods work such as a flexible mounting of the clamping assembly to a work bench or vise. Also, an oscillator assembly having a flexible member with a rectangular cross-section and a preferred deflection plane is discussed, but other cross-sections will work such as an oval. Thus, the scope of the invention should be determined by the appended claims and their legal equivalents, rather than by the examples given.

I claim:

1. An oscillation analyzer for a golf shaft assembly, the analyzer comprising:
   an oscillator having known oscillation properties including a first natural frequency when oscillating in a first deflection plane and a second natural frequency when oscillating in a second deflection plane;
   an oscillation of the golf shaft assembly and of the oscillator;
   an oscillation coupling means which can couple oscillation of the golf shaft assembly to that of the oscillator and in which the oscillation coupling increases as the oscillation frequency of the oscillator approaches the natural frequency of the golf shaft assembly;
   wherein the first natural frequency is farther from the natural frequency of the golf shaft assembly than the second natural frequency, thereby resulting in the coupling means being more effective for oscillator oscillation having the second natural frequency and the second deflection plane than for oscillator oscillation having the first natural frequency and first deflection plane;
   whereby the analyzer can provide information concerning the oscillation properties of the golf shaft assembly.

2. The analyzer of claim 1 wherein it is also known that the oscillation of the oscillator in the second deflection plane is essentially a flat line oscillation.

3. The analyzer of claim 1 wherein the information concerning the golf shaft assembly's oscillation properties includes information about its natural oscillation frequency and information concerning a flat line oscillation plane.

4. The analyzer of claim 1 wherein the oscillator is twanged in substantially the second deflection plane with the golf shaft assembly substantially at rest and the coupling means urges the golf shaft assembly to oscillate substantially in only the second deflection plane.

5. The analyzer of claim 4 wherein the golf shaft assembly periodically approaches a resting condition.

6. The analyzer of claim 1 wherein the coupling means is substantially operationally ineffective for oscillation in the first deflection plane.

7. The analyzer of claim 1 wherein the oscillator has a flexible member which is less flexible when deflected in the first deflection plane than when deflected in the second deflection plane, whereby the first natural frequency is higher than the second natural frequency.

8. The analyzer of claim 1 wherein the oscillator has a flexible member, the flexible member has a cross section which is substantially perpendicular to the first and second deflection planes, and said cross section has a higher moment of inertia.

9. The analyzer of claim 1 wherein the oscillator has a flexible member and a cross section of the flexible member, which is substantially perpendicular to the first and second deflection planes, is substantially a rectangle.

10. The analyzer of claim 1 wherein the first and second deflection planes are substantially orthogonal.

11. An oscillation analyzer for a golf shaft assembly, the analyzer comprising:
   a clamping apparatus to hold the golf shaft assembly;
   an oscillator attached to the clamping apparatus;
   an oscillation of the golf shaft assembly and of the oscillator, the oscillation of the oscillator having known properties;
   wherein the clamping apparatus provides an oscillation coupling between the golf shaft assembly and the oscillator and in which the oscillation coupling increases as the oscillation frequency of the oscillator approaches the natural frequency of the golf shaft assembly;
   wherein the oscillator has a flexible member with a first flexibility profile in a first deflection plane and a second flexibility profile in a second deflection plane whereby the oscillator has a first natural frequency when oscillating in the first deflection plane and a second natural frequency when oscillating in the second deflection plane;
   and wherein the first natural frequency is farther from the natural frequency of the golf shaft assembly than the second natural frequency and therefore the oscillation coupling is more effective for oscillation in the second deflection plane with the second natural frequency than for oscillation in the first deflection plane with the first natural frequency;
   whereby the analyzer can provide information concerning the golf shaft assembly's oscillation properties.

12. The analyzer of claim 11 wherein the oscillation coupling is substantially operationally ineffective for oscillator oscillation in the first deflection plane.

13. The analyzer of claim 11 wherein the oscillation of the oscillator in the second oscillation plane is substantially a flat line oscillation.

14. The analyzer of claim 11 wherein the oscillation coupling urges the golf shaft assembly to detect substantially in only the second deflection plane and therefore oscillate substantially in only the second deflection plane.

15. The analyzer of claim 11 wherein the golf shaft assembly is analyzed while in a first rotational position in the clamping apparatus and while in a second rotational position in the clamping apparatus.

16. An oscillation analyzer for a golf shaft assembly, the analyzer comprising:
   a clamping apparatus to hold the golf shaft assembly;
   an oscillator attached to the clamping apparatus, the oscillator having a natural frequency which is adjustable;
   an oscillation of the golf shaft assembly and of the oscillator, the oscillation of the oscillator having known properties;
   whereby the analyzer can provide information concerning the golf shall assembly's oscillation properties.

17. The analyzer of claim 16 wherein the oscillator has a moveable weight, the movement of which adjusts the oscillator's natural frequency.

18. The analyzer of claim 16 wherein the oscillator has a moveable flexible member, the movement of which adjusts the oscillator's natural frequency.

19. The analyzer of claim 16 wherein the oscillator is marked to indicate its natural frequency at various positions of adjustment.

20. The analyzer of claim 16 wherein the information includes the natural frequency of the golf shaft assembly.

* * * * *